Jan. 30, 1934.                F. H. BENGE                1,945,414
               METHOD OF PRODUCING SEGMENTAL RIMS
              Original Filed March 25, 1930    5 Sheets-Sheet 1
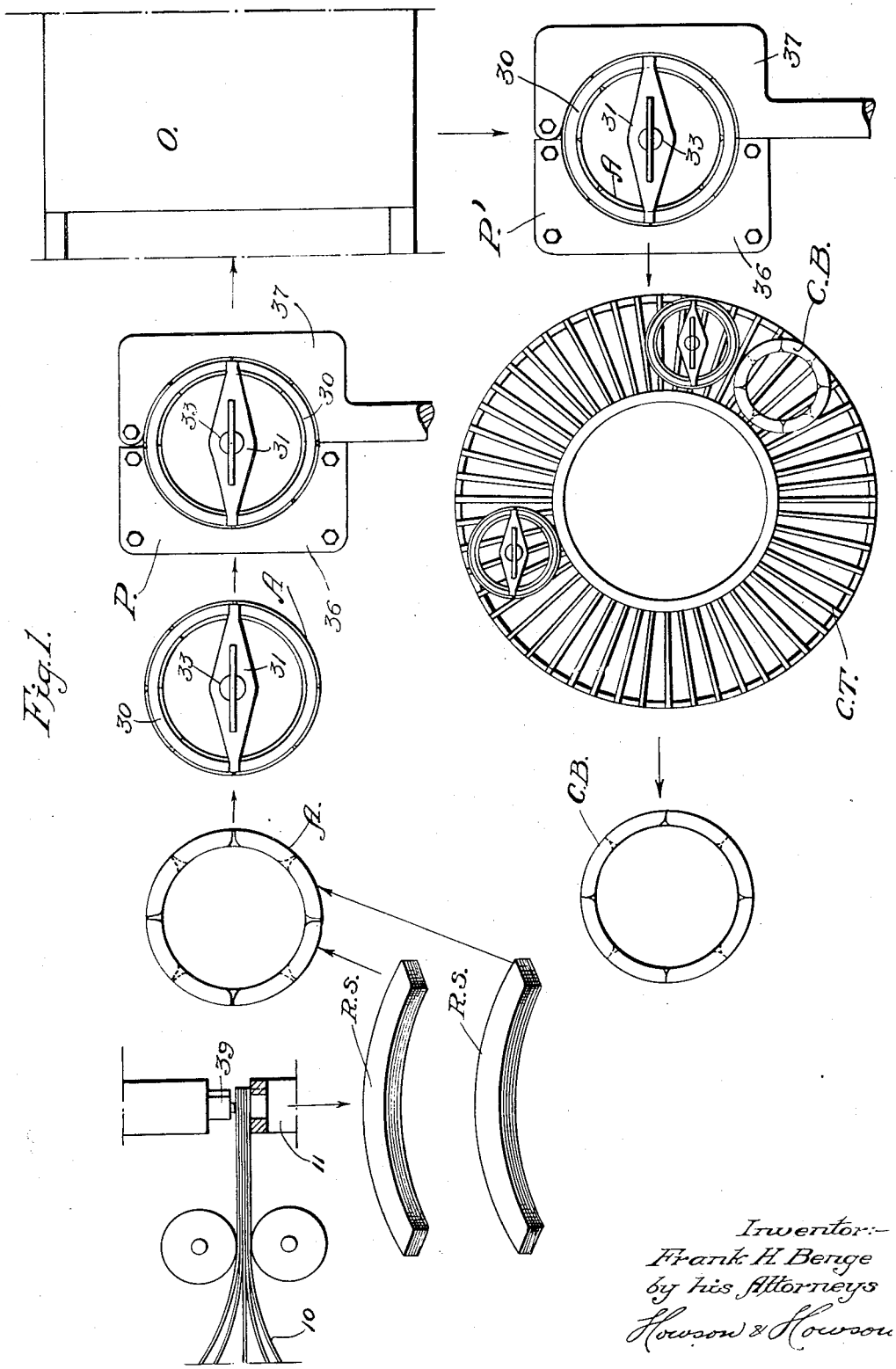

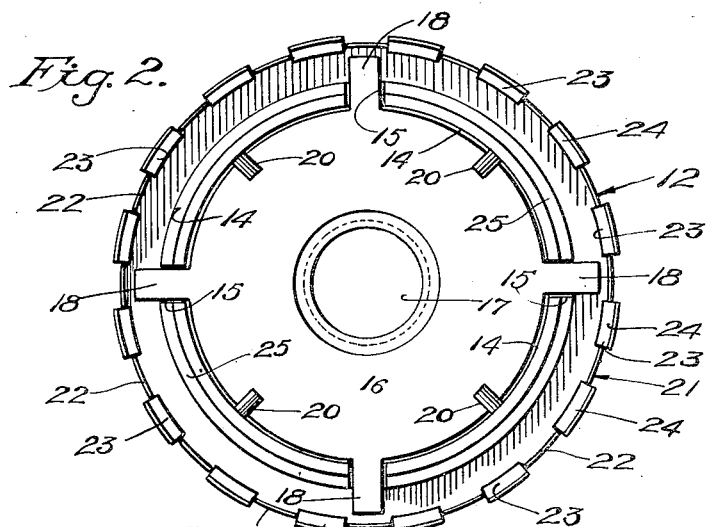
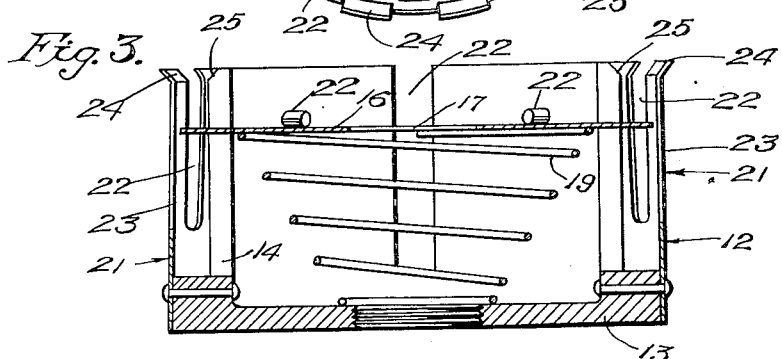
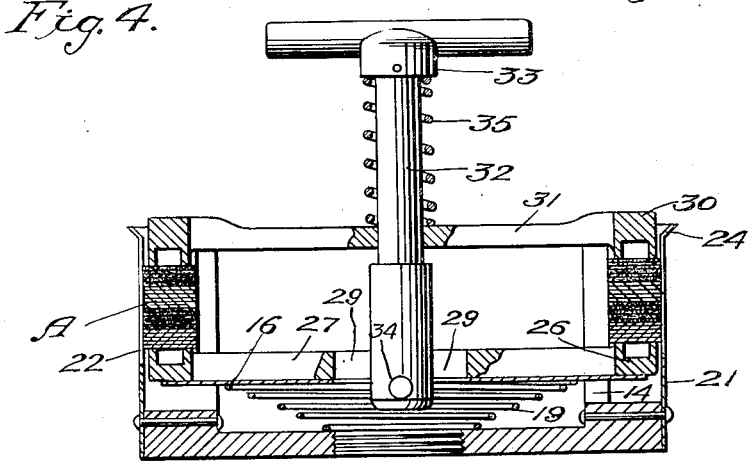

Jan. 30, 1934.  F. H. BENGE  1,945,414
METHOD OF PRODUCING SEGMENTAL RIMS
Original Filed March 25, 1930  5 Sheets-Sheet 3
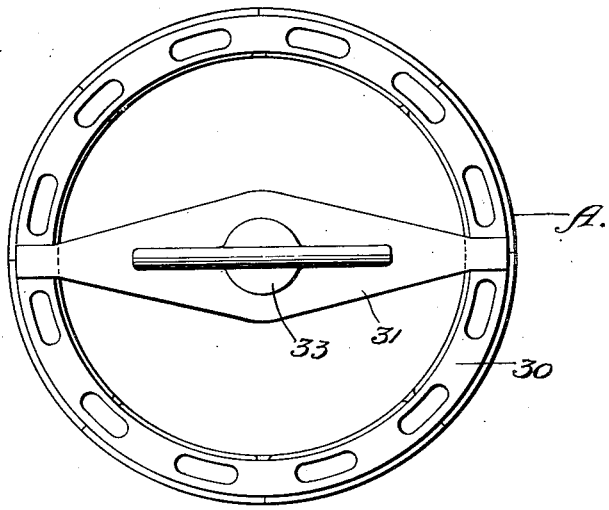
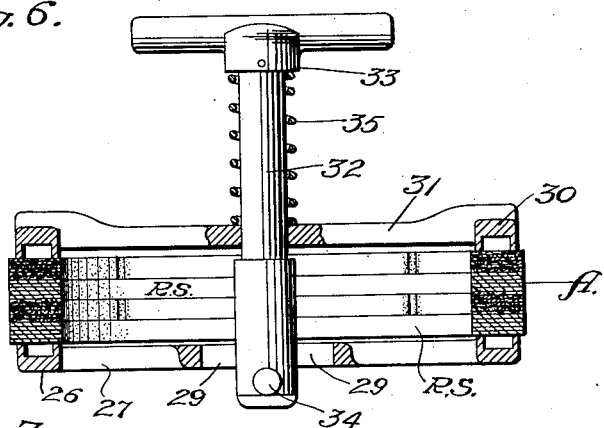
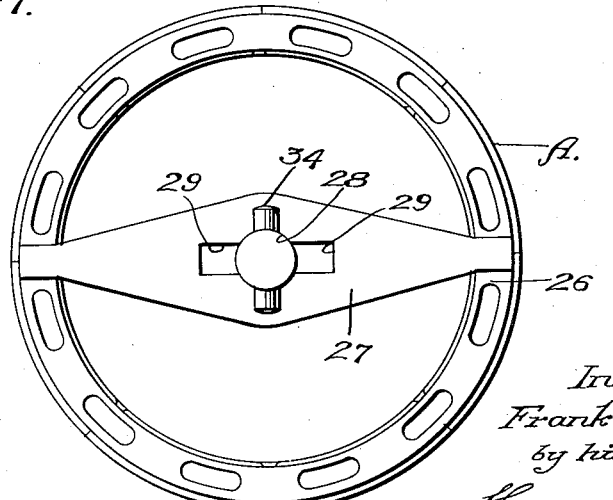
Inventor:—
Frank H. Benge
by his Attorneys
Howson & Howson Jan. 30, 1934.  F. H. BENGE  1,945,414
METHOD OF PRODUCING SEGMENTAL RIMS
Original Filed March 25, 1930   5 Sheets-Sheet 4
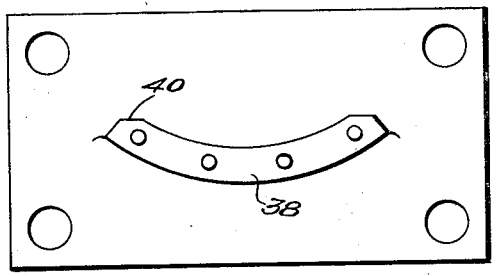
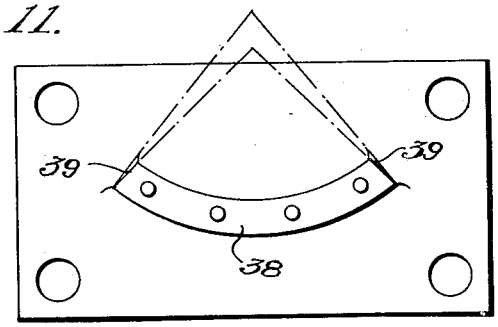
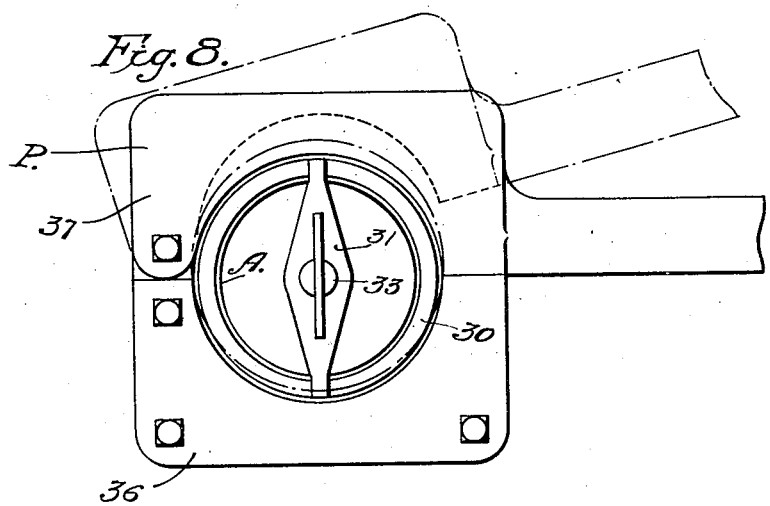
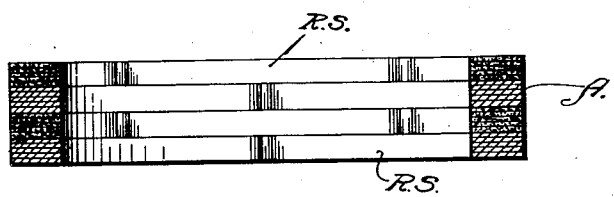
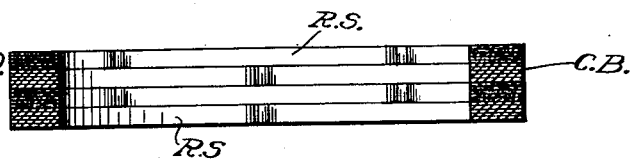
Inventor:—
Frank H. Benge
by his Attorneys
Howson & Howson Jan. 30, 1934.  F. H. BENGE  1,945,414
METHOD OF PRODUCING SEGMENTAL RIMS
Original Filed March 25, 1930  5 Sheets-Sheet 5
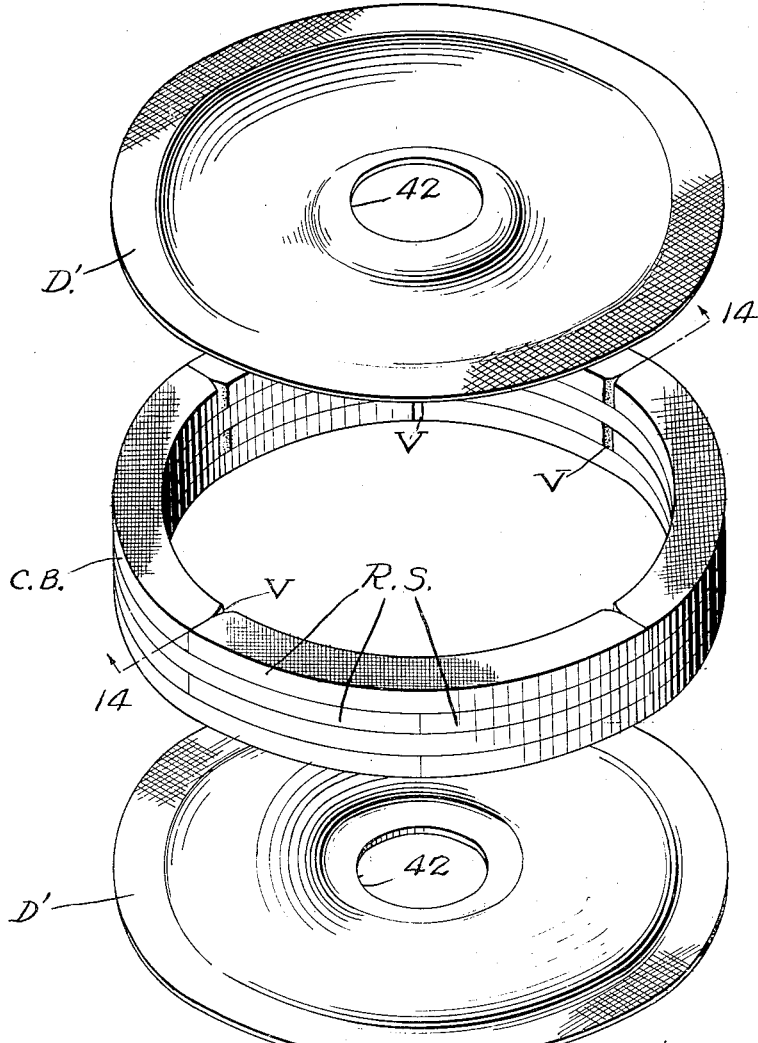
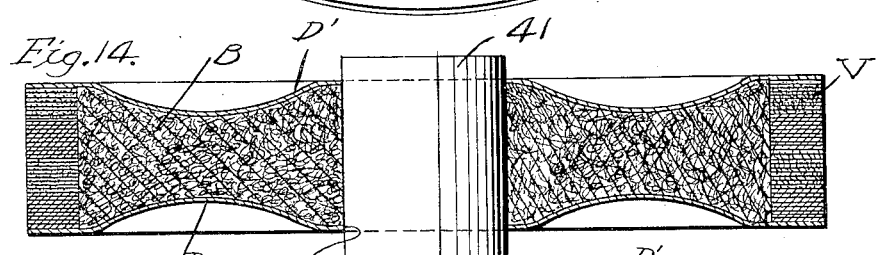
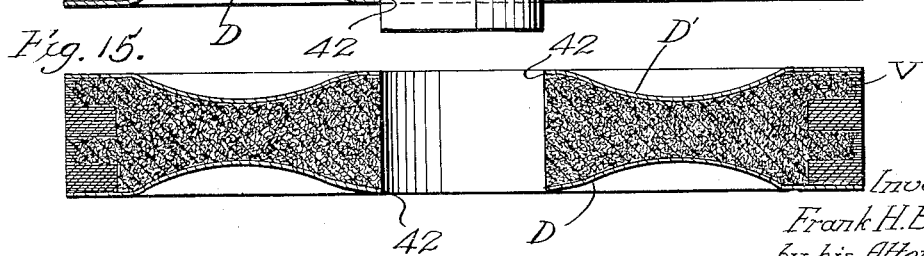
Inventor.
Frank H. Benge
by his Attorneys
Howson & Howson Patented Jan. 30, 1934

1,945,414

UNITED STATES PATENT OFFICE 1,945,414

METHOD OF PRODUCING SEGMENTAL RIMS

Frank H. Benge, Bridgeport, Pa., assignor to Continental-Diamond Fibre Company, Newark, Del., a corporation of Delaware Original application March 25, 1930, Serial No. 438,879. Divided and this application May 31, 1932. Serial No. 614,650

11 Claims. (Cl. 154—2)

This invention relates to a method of producing segmental rims, and is in part a division of my prior application filed April 9, 1929, Serial No. 353,794 for Cementing process, and in part a division of my prior application filed March 25, 1930, Serial No. 438,879 for Method of and apparatus for producing segmental rims.

More specifically, the invention relates to methods for the production of rim blanks for the rims of so-called fibre gears. In the ordinary method of producing such gears, a fabric is impregnated, or relatively heavily coated, with a material such as a heat-convertible artificial resin, following which the fabric sheet is punched, or otherwise subdivided, to form arcuate segments. The segments are assembled by hand in a suitable form and are then tied or otherwise secured together until they can be passed through some process rendering the impregnating material effective to bond the segments and thus form the rim.

In such an assembly, due to the fact that it is produced by individual placement of the segments by hand, there is, naturally, considerable looseness and considerable inaccuracy in the disposition of the several parts. The assembly is both tedious and costly and when completed is difficult to handle due to the fact that in handling the individual segments the threads of the fabric become separated and project from the assembly and the strings ordinarily employed to maintain the assembly project therefrom and are liable to be caught in adjacent articles. If the assembly requires 60 segments of the thickness of the sheet material in order to produce a desired thickness in the completed rim assembly, 60 individual operations are essential in the mere placement of the segments.

An important object of the present invention is the provision of a method of assembling the rims in which it is possible to simultaneously assemble a number of the segmental layers of the fabric in the form of a single segment.

As hereinbefore pointed out, the assemblies produced by hand are very loose in character and are difficult to handle in placing in the mold. Accordingly, a further object of the invention is the provision of a method whereby such assemblies may be compactly constructed initially and then further compacted before they are placed in the mold in their use in formation of the gears.

A further object of the invention is the provision of a method permitting such blanks to be processed to preliminarily bond the same, in which the blanks are so maintained in assembled relation that in the preliminary bonding process they are compacted and at the same time held in such position that they may be treated to eliminate any malformations occurring as a result of treatment in the preliminary bonding process.

These and other objects I attain by the method set forth hereinafter and illustrated in the accompanying drawings wherein:

Fig. 1 is a diagrammatic view illustrating the steps in a rim-producing method following my invention;

Fig. 2 is a plan view of the assembly holder;

Fig. 3 is a vertical sectional view therethrough;

Fig. 4 is a view similar to that of Fig. 3, showing the holder with the clamp in position therein;

Fig. 5 is a plan view of the clamp removed;

Fig. 6 is a vertical sectional view through the clamp with the rim in position therein;

Fig. 7 is a bottom plan view of the clamp;

Fig. 8 is a plan view of the press;

Figs. 9 and 10 are comparative views illustrating the relative depths of the rim before and after treating to render the bonding agent effective;

Fig. 11 is a bottom plan view of one form of die for forming the segments;

Fig. 12 shows a modified form of die;

Fig. 13 is a combined perspective showing the rim and the cover members employed in the construction of a gear;

Fig. 14 is a sectional view showing the cover members and rim assembled and the web-forming material in position for completion of the gear blank; and Fig. 15 is a sectional view through the completed gear blank illustrating the manner in which the web portions of the gear interlock with the rim.

In carrying out my method, I first employ a plurality of bands of binder-impregnated or coated fabric indicated at 10, the binder employed being preferably a synthetic resin or its equivalent. These bands are brought together in a punching die indicated at 11, the die simultaneously operating through all of the bands to strike a segment from the assemblage. The rim segments RS are then assembled to produce an annulus having a diameter slightly greater than that of the desired rim element, as indicated at A. Assembly of the segments in this manner allows sufficient space between adjacent ends of the segments to insure against any possible voids in the completed structure resulting from overlapping of segments of the same layer of the rim; thus enabling the use of the thicker rim segments RS instead of the single thickness rim segments ordinarily employed.

The assembly is preferably made in a holder 12 (Fig. 2) of the type illustrated in my prior application, Serial No. 438,879, hereinbefore mentioned, this holder comprising a bottom wall 13 having arising therefrom at a point spaced inwardly from the perimeter thereof a rigid wall 14 which is slotted at diametrically opposed points as indicated at 15 with vertically extending slots which open through the upper end of the wall. Within this wall is disposed a plate 16 having a central opening 17 and having ends 18 projecting through the slots. A light spring 19 constantly urges this plate upwardly and pins 20 limit the upward movement of the plate at a point adjacent the upper end of the wall 14. Projecting upwardly from the perimeter of the bottom wall 13 is an annular wall 21 formed of some suitable spring material, such as brass, and having its upper portion vertically slotted at 22 to produce spring fingers 23, the upper ends of which have outwardly turned portions 24. The spring fingers 23 at their upper ends are spaced from the rigid wall a distance less than the radial width of the segments RS, which are to be assembled in the holder. The upper end of the rigid wall 14 at its outer face is beveled as at 25 so that the inner and outer walls combine to produce a flaring mouth in which the segments to be assembled may be introduced.

In combination with these holders 12 I provide clamps, each comprising a base portion in the form of an annular ring 26 having a transversely extending strut 27 which, at its axis, is provided with an opening 28 having diametrically opposed coves 29. The clamp further comprises a similar ring 30, the strut 31 of which has slidably and rotatably directed therethrough at its axis the stem 32 of a clamp rod which has a head 33 at one end and has a cross pin 34 directed therethrough at the opposite end. A spring 35 extends between the cross bar 31 and the head 33.

Before beginning assembling of an annulus A, the base portion of the clamp is placed in position in the holder, the ring thereof lying between the inner and outer walls of the holder. The segments are forced into the flaring mouth of the holder, preferably by the power of the press punching out the segments as set forth in my prior application, Serial No. 438,879. Without regard to the manner in which they are placed in the holder, the springs 19 will tend to force the base of the clamp upwardly until further upward movement of the segments lying upon this base is limited by the compression and friction exerted thereon by the inner and outer walls of the holder so that without regard to the manner of placing the segments in the holder it will be obvious that those segments last placed will be so positioned that they can be readily observed and any displacement thereof corrected to prevent overlapping.

When the annulus assembly A has been completed, the upper ring is placed in position, the clamping rod having been previously positioned so that the pin 34 will enter through the coves 29 of the strut 27 of the bottom ring. The clamping rod is forced through the bottom ring against the action of the spring and rotated through 90 degrees to displace the pin 34 from the coves when the clamping rod may be employed as a handle for handling both clamp and the assembly A, spring 35 acting to hold the rings together upon the rim and to continuously exert pressure upon the rim in the direction of the axis thereof. This feature of the action of the clamp is important, as will hereinafter become obvious.

The assembly A retained in the clamp is then passed to a press P comprising fixed and movable jaws 36 and 37 having arcuate confronting faces adapted to engage the segments and force them radially inwardly, thus constricting the annulus A to its desired final dimensions. The The annulus A is then treated as in oven O to render the bonding agent, with which the material thereof is impregnated, sufficiently adhesive to cause the segments and the elements composing the segments to be firmly bonded together. When employing a synthetic resin compound, the treating means preferably comprises an oven, but this treating means may, obviously, be modified in accordance with the particular bonding agent employed. The impregnating material, which is ordinarily applied to the bands in liquid form, for example, as a varnish, dries after application, with the result that the several bands 10 which are employed in making up the rim segments RS have actually a greater thickness than they normally would have. In the treating, to effect the preliminary bonding of the assembly A, this bonding agent is softened and the several plies or bands constituting the rim segments RS become pliable and tend to settle into position. They are forced into this position by the spring action of the clamp which affords a follow-up pressure as the annulus shrinks axially. In a band constructed for use in the manufacture of gears having 1″ faces, the initial assemblage has an approximate thickness axially of 1½″ before the preliminary bonding treatment; following this treatment, the band has shrunk to 1⅛″ in thickness, a movement of the clamp elements of ⅜″ (see Figs. 9 and 10). The clamp thus serves to insure both proper compacting of the structure and proper contact of the bonding agent of the several layers with one another.

Following the preliminary step, the annulus, still in position in the clamp, is placed in the second press P′, this press being identical in structure with the press P and being employed for the purpose of removing any contour malformations occurring as a result of handling of the band during the preliminary bonding treatment. Such malformations having been removed, the band is placed upon a cooling table CT where, by means of a blast of air, the bonding agent is set so that the clamp may be removed, giving a completed assembly or blank CB. These blanks are very rigid and can be conveniently handled since they have a substantially exact peripheral contour and may be placed in molds without danger of projecting portions catching upon the mold surface or upon adjacent bodies. Due to their rigidity, they may be thrown into baskets or trays for transportation and may be, if desired, stored for a very considerable time before using.

The die employed in producing the segments RS is preferably so formed that the segments when brought into end-to-end relation will produce at the outer surface of the completed blank CB a continuous surface while at the inner surface notches V are formed. This may be accomplished in either of two manners; the punch 38 may either have its end faces at an angle less than the angle subtending the segments, as indicated at 39 in Fig. 11, or the inner corners of the punch may be dubbed, as shown at 40 in Fig. 12. The voids, or notches, V thus provided at the inner surface of the blank serve a useful purpose in the assembly of the gear, as more clearly shown in Figs. 13 to 15.

In the assembly of the gear, the completed rim blank CB is imposed upon a preformed disc D of impregnated fabric, the material employed in impregnation being similar to that employed in the impregnation of the material of bands 10 forming the rim segments RS. This disc may consist of either a single ply or a multiplicity of plies of the impregnated material and after the rim has been placed in position thereon and a hub element or plug 41 placed in position in the central opening 42 of the disc, the body material is placed in position in the annular cavity thus produced. This body material may be composed of resinous molding powder containing a filler, a mass of loose fibres associated with the resin or sizeable pieces of fabric integrated with the resin. The last-named material is to be preferred and is usually obtained by cutting scrap fabric resulting from the preparation of the rim segments into smaller irregular pieces, for example, the size of a dime or quarter. The body material is simply placed in position, after which another disc section D—1 is placed over the rim and the body material. From this point on, the process of producing the gear is that ordinarily employed in producing such gears, the same being placed in the press where it is subjected to heat and pressure. This results in the material of the body B being forced into the notches V of the rim and the amalgamation of the material of the rim with the material of the body through the interlocks thus provided and through the merging of the bonding material of the body and rim with one another. If the binder employed is a heat-convertible synthetic resin, the heat and pressure treatment is sufficient to convert the resin associated with the rim and web into the so-called final, infusible, insoluble stage, resulting in a unitary structure.

Since the method herein set forth is obviously capable of modification without in any manner departing from the spirit of my invention, I do not wish to be understood as limiting myself thereto except as hereinafter claimed.

I claim:

1. The method of assembling circular segmental bodies consisting in initially assembling the segments with adjacent faces thereof spaced and yieldably holding the segments in their assembled relation and while holding the same reducing the diameter of the assembly by radially applied pressure.

2. The method of assembling circular multi-layer segmental bodies, consisting in consecutively assembling the layers with the joints between the segments of adjacent layers staggered with relation to one another and adjacent faces of the segments of each layer spaced, yieldably holding the body in its assembled relation, and while holding the same, reducing the diameter of the assembly by radially applied pressure.

3. The method of assembling circular segmental bodies consisting in employing segments impregnated with a bonding agent, assembling the segments upon a diameter greater than that of the body to be produced, with adjacent faces of the segments in spaced relation to one another, yieldably holding the segments in their assembled relation and while holding the same first reducing the diameter of the body to its intended size by radially applied pressure and then subjecting the body to treatment rendering the bonding agent effective.

4. The method of assembling circular segmental bodies consisting in employing segments impregnated with a bonding agent, assembling the segments upon a diameter greater than that of the body to be produced, with adjacent faces of the segments in spaced relation to one another, yieldably holding the segments in their assembled relation and while holding the same first reducing the diameter of the body to its intended size by radially applied pressure, subjecting the body to treatment rendering the bonding agent effective and subjecting the body to radial pressure while the bonding agent is effective.

5. The method of assembling circular segmental bodies consisting in employing segments impregnated with a bonding agent, assembling the segments upon a diameter greater than that of the body to be produced, with adjacent faces of the segments in spaced relation to one another, yieldably holding the segments in their assembled relation and while holding the same first reducing the diameter of the body to its intended size by radially applied pressure, subjecting the body to treatment rendering the bonding agent effective, subjecting the body to radial pressure while the bonding agent is effective, and finally treating the body to set the bonding agent.

6. The method of assembling multi-layer circular segmental bodies comprising initially assembling the segments of each layer with adjacent end faces thereof spaced, forming the desired number of layers, applying axial pressure to the assemblage, and while applying such pressure forcing the segments radially inwardly to thereby reduce the diameter of the assemblage and bring the end faces of the segments into engagement with one another.

7. The method of assembling multi-layer circular segmental bodies comprising initially assembling the segments of each layer with adjacent end faces thereof spaced, forming the desired number of layers, applying axial pressure to the assemblage, and while applying such pressure first forcing the segments radially inwardly to thereby reduce the diameter of the assemblage and bring the end faces of the segments into engagement with one another and, second, treating the assemblage to render the bonding agent effective.

8. The method of assembling mutli-layer circular segmental bodies comprising initially assembling the segments of each layer with adjacent end faces thereof spaced, forming the desired number of layers, applying axial pressure to the assemblage, and while applying such pressure first forcing the segments radially inwardly to thereby reduce the diameter of the assemblage and bring the end faces of the segments into engagement with one another, second, treating the assemblage to render the bonding agent effective and, third, reshaping the body while the bonding agent is still effective.

9. The method of producing annular rims for use in the formation of composite gears comprising providing thick segments each having an outer face subtending a radial angle of greater length than that subtended by the inner face of the segment, assembling the rim in a series of layers in which the segments of each layer have the end faces thereof in confronting relation while staggering the segments of adjacent layers whereby the inner face of the completed rim has notches at the junction of the adjacent ends of the segments and said notches are axially as well as circumferentially spaced.

10. The method of assembling segmental rims comprising employing thick segments each having an outer face subtending a greater radial angle than that subtended by the inner face of the segment, assembling the segments with adjacent ends thereof spaced, yieldably holding the segments in their assembled relation and while holding the same reducing the diameter of the assembly to bring the ends of the segments into abutting relation.

11. The method of claim 10 including the step of assembling the rim in layers while staggering the segments of adjacent layers with relation to one another.

FRANK H. BENGE.